United States Patent [19]

Scura et al.

[11] Patent Number: 5,793,566
[45] Date of Patent: Aug. 11, 1998

[54] SELF SECURING COMPLIANT GASKET FOR A DISK DRIVE ASSEMBLY HOUSING

[75] Inventors: John Edward Scura, Thousand Oaks; Haldun Arin, Moorpark, both of Calif.

[73] Assignee: Micropolis Corporation, Chatsworth, Calif.

[21] Appl. No.: 712,288

[22] Filed: Sep. 12, 1996

Related U.S. Application Data

[63] Continuation of Ser. No. 179,359, Jan. 10, 1994, abandoned.
[51] Int. Cl.$^6$ ................................................ G11B 33/14
[52] U.S. Cl. ............................................ 360/97.02
[58] Field of Search ............................ 360/97.02, 97.01, 360/97.03, 99.08, 98.07, 97.04; 277/235 A, 235 B, 215, 183, 180, 189, 181; 215/235

[56] References Cited

U.S. PATENT DOCUMENTS

| | | | |
|---|---|---|---|
| 3,940,155 | 2/1976 | Baumle | 277/183 |
| 3,957,275 | 5/1976 | Belter et al. | 277/11 |
| 4,192,520 | 3/1980 | Hasegawa | 277/235 |
| 4,405,136 | 9/1983 | Elsing et al. | 277/12 |
| 4,672,994 | 6/1987 | Ko | 277/183 |
| 4,846,482 | 7/1989 | Blodgett et al. | 277/235 |
| 4,950,521 | 8/1990 | Takamura et al. | 277/235 |
| 5,004,207 | 4/1991 | Ishikawa et al. | 360/97.02 |
| 5,024,863 | 6/1991 | Gibbon | 277/235 B |
| 5,150,267 | 9/1992 | Reinisch | 360/97.02 |
| 5,194,696 | 3/1993 | Read | 174/65 |
| 5,223,996 | 6/1993 | Read et al. | 360/97.02 |
| 5,272,580 | 12/1993 | Hickox et al. | 360/97.02 |
| 5,282,101 | 1/1994 | Reinisch | 360/97.02 |
| 5,317,462 | 5/1994 | Kakizaki et al. | 360/97.03 |
| 5,326,611 | 7/1994 | Kishita et al. | 360/97.02 |

FOREIGN PATENT DOCUMENTS

| | | | |
|---|---|---|---|
| 4027499 | 3/1992 | Germany | 277/183 |
| 62-279586 | 12/1987 | Japan | 360/97.01 |
| 62-279587 | 12/1987 | Japan | 360/97.01 |
| 2239680 | 7/1991 | United Kingdom | 277/189 |
| 2258276 | 2/1993 | United Kingdom | 277/189 |

*Primary Examiner*—Allen Cao
*Attorney, Agent, or Firm*—Oppenheimer Poms Smith

[57] ABSTRACT

A novel self-securing sealing gasket for a disk drive assembly housing ensures predictable securement of the sealing gasket to a mounting surface. Elastomeric material is preferably molded to a rigid frame. The elastomeric material defines the sealing member of the gasket, while the frame provides structural rigidity and concomitant ease of handling during assembly and disassembly of the disk drive assembly housing. A plurality of recesses are provided along the periphery of the frame for mechanically coupling with the sealing member. The compliant sealing member includes a first sealing surface having a convex profile. A plurality of vacuum cavities are integrally incorporated along a second sealing surface of the sealing member for providing vacuum coupling between the second sealing surface and the mounting surface of the base of a disk drive assembly housing. Predictable securement of the sealing gasket to the housing base during disassembly of the disk drive assembly housing is provided by the vacuum coupling between the second sealing surface and the base mounting surface in conjunction with a repellant force generated by the convex shape of the first sealing surface which is exerted against the housing cover. Self-alignment of the sealing gasket is afforded by alignment tabs provided on the rigid frame and corresponding receiving notches in the housing base for receiving the alignment tabs.

13 Claims, 3 Drawing Sheets

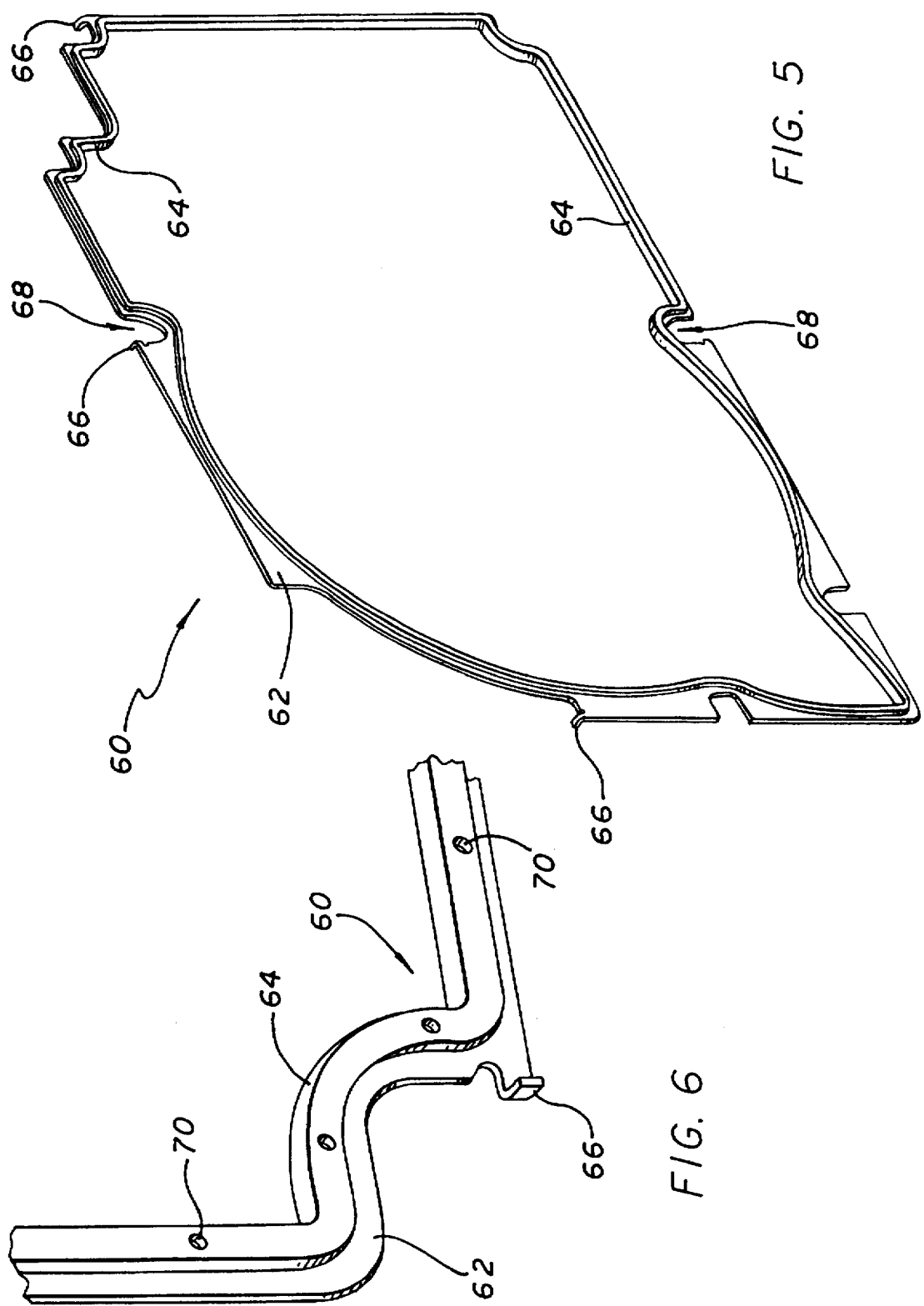

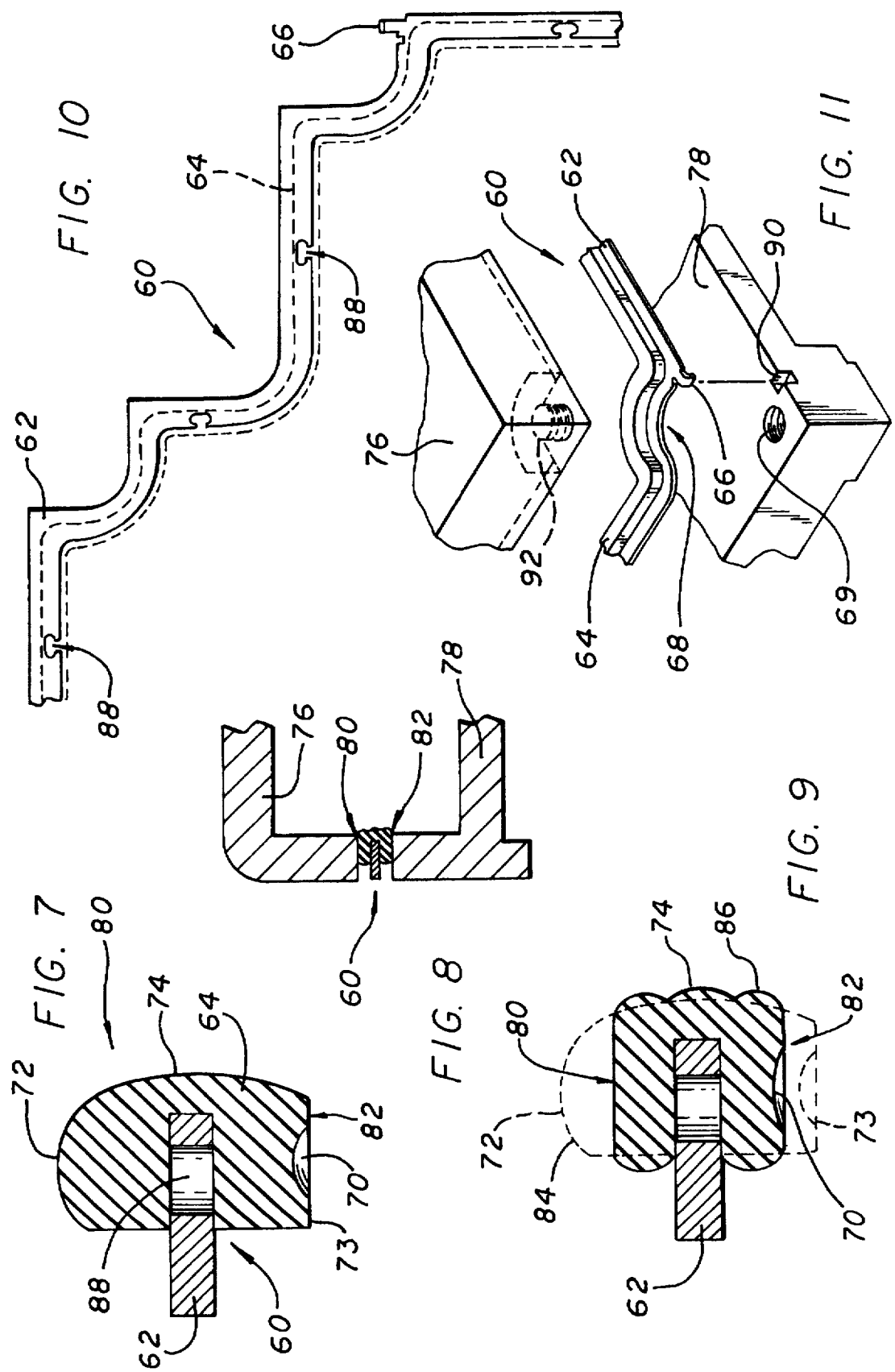

SELF SECURING COMPLIANT GASKET FOR A DISK DRIVE ASSEMBLY HOUSING

This application is a continuation of application Ser. No. 08/179,359, filed Jan. 10, 1994, now abandoned.

FIELD OF THE INVENTION

The present invention relates generally to disk drive assemblies, and more particularly, to an apparatus and method for sealing a disk drive assembly housing.

BACKGROUND OF THE INVENTION

In the disk drive manufacturing industry, various methods have been developed and employed to provide effective hermetic and near-hermetic sealing of the housing containing a hard disk drive assembly. A typical disk drive assembly includes a number of magnetic storage disks mounted coaxially about a common spindle which rotate at speeds in excess of several thousand RPM. Digital information is written to and read from the magnetic disks by magnetic read/write heads which hover on a cushion of air typically less than a micrometer above the rotating disks. The extremely narrow clearance between the floating magnetic head and magnetic disk facilitates fast access times and increased read/write efficiency.

It is well appreciated in the disk drive industry that serious damage to the magnetic disks and magnetic heads can result from gaseous and particulate contaminants being introduced into the clean environment within which the sensitive disk drive assembly components are housed. Catastrophic damage to the disk surfaces and the magnetic heads, as well as irretrievable loss of stored data, often result from such contamination.

A well known method for reducing the level of contaminants potentially introduced into the clean environment of the disk drive assembly housing involves employment of a sealing gasket which is typically disposed between a base and a cover defining the housing. As shown in FIG. 2, a flexible gasket 20 is disposed between a housing base 30 and a housing cover 28 of a disk drive unit 40. A conventional method of positioning and securing the gasket 20 to the housing base 30 involves the machining of a gasket groove 21 into which the flexible gasket may be inserted. The gasket groove 21 is typically cut along the periphery of the housing base 30. The gasket 20 is often constructed from flexible rubber or silicone. When the gasket 20 is properly installed into the gasket groove 21, the gasket 20 generally extends slightly above the mounting surface of the housing base 30. The housing cover 28 and base 30 are then screwed together, thus compressing the gasket 20 between the mounting surfaces of the cover 28 and base 30.

This conventional sealing scheme requires expensive machining of the gasket groove 21 in the housing base 30, and requires time consuming installation of the gasket 20 into the gasket groove 21. Moreover, because of the elastic nature of the gasket 20, a high degree of variation with respect to the dimensions of the gasket 20 typically exists within the gasket groove 21 as the installer usually stretches and compresses the gasket 20 as it is being installed into the gasket groove 21. The imprecision associated with installing a flexible gasket 20 into a gasket groove 21 provided on a housing base 30 often results in misalignment of, and damage to, the flexible gasket 20, thereby rendering the gasket 20 ineffectual.

Other sealing methods have been developed in an attempt to increase the service life of the gasket and to remedy misalignment problems. Once such improved gasket configuration involves the use of a semi-flexible metallic frame onto which two elastomeric members are bonded. Although the resultant three-part gasket may be considered an improvement over the aforementioned gasket configuration, it has been determined by the inventors that conventional three-part gaskets continue to suffer from a number of deficiencies.

A typical three-part gasket is typically constructed by chemically bonding two continuous, flat, resilient sealing members to respective upper and lower surfaces of a semi-flexible frame. The semi-flexible frame is often fashioned from thin, flexible, foil-like metal. A primer or adhesive is typically applied to the surfaces of the metallic frame, and is allowed to cure for a predetermined period of time. Such primers or adhesives have the property of chemically adhering to both elastomeric materials and metallic materials.

A major deficiency associated with chemically bonding a sealing gasket member to a metallic frame concerns special tooling which is required to fabricate the sealing gasket. The semi-flexible frame is generally placed in a jig, with one or more masks being placed over the frame to restrict the primer to only those areas which will be contacting the elastomeric sealing material. The primer is generally applied to the metallic frame by use of atomizing spray equipment, such as an airless spray system. A second jig is often required to facilitate proper application of the two flexible sealing members to the metallic frame surfaces. After the sealing members have been properly positioned on the metallic frame, the gasket assembly is then set aside for a second predetermined period of time to allow for a complete cure at the two critical metallic frame/adhesive/sealing member interfaces. Only after completion of these processing steps can the conventional three-part gasket be installed into the disk drive assembly housing.

Several deficiencies associated with a three-part gasket constructed in accordance with this method have been identified by the inventors. The numerous processing steps required to construct a conventional three-part gasket escalate the cost of the gasket due to the various jigs, masks, and primers which are used in the process of chemically bonding the two sealing members to the metallic frame. Moreover, the fabrication process is labor intensive, with each processing step increasing the possibility of introducing immediate or latent defects into the gasket assembly.

In the event of a fabrication defect or failure, such as an appreciable misalignment between the metallic frame and either one of the two sealing members, the entire three-part conventional gasket assembly is typically scrapped. Removing the misaligned sealing members from the frame and cleaning the adhesive from the metallic surface typically results in excessive bending or distortion of the metallic frame. Also, imperfect cleansing of the bonding surfaces of the metallic frame often leaves the frame unusable for future gasket fabrication. Further, the adhesive or primer employed is subject to chemical deterioration over time which can result in outgassing of contaminants into the clean environment of the disk drive assembly housing, and, more importantly, deterioration of the critical sealing interfaces between the gasket and the mounting surfaces of the housing.

A conventional three-part sealing gasket 20, as shown in FIG. 4, typically includes a semi-flexible metallic frame 22 onto which an upper sealing member 24 and a lower sealing member 26 are chemically bonded. As further shown in FIG. 3, this conventional gasket 20 is generally disposed between a housing cover 28 and a housing base 30 which define the disk drive assembly housing. A significant deficiency with respect to this conventional three-part sealing gasket 20 concerns the excessive number of sealing interfaces associated with its use in a disk drive assembly housing as shown in FIG. 4.

In such a configuration, four sealing interfaces are implicated: A first sealing interface 32 between the mounting surface of the cover 28 and the top surface of the upper sealing member 24; a second sealing interface 34 between the bottom sealing surface of the upper sealing member 24 and the top surface of the frame 22; a third sealing interface 36 between the bottom surface of the frame 22 and the top surface of the lower sealing member 26; and a fourth sealing interface 38 between the bottom sealing surface of the lower sealing member 26 and the mounting surface of the housing base 30. A failure at any one of these critical sealing interfaces can compromise the efficacy of the entire gasket assembly 20.

It has been found that conventional three-part gaskets similar to the one illustrated in FIGS. 3 and 4 often require excessive levels of compression in order to provide adequate sealing of the disk drive assembly housing. These excessive compressive forces typically cause the elastomeric material to compress beyond its maximum elongation, and, consequently, induce accelerated deterioration and fracturing of the upper and lower sealing members 24 and 26. These fractures permit the ingress of chemicals and other contaminants which attack the sealing members and substantially decrease the service life of the sealing gasket 20. Moreover, the excessive levels of compression required to seal the housing often results in varying degrees of warpage of the housing base 30. It is well appreciated that excessive warpage of the housing base 30, which supports the sensitive components of the disk drive assembly, can result in the misalignment of the components beyond their maximum allowable tolerances, and may result in catastrophic or accelerated damage thereto.

Another significant deficiency associated with conventional three-part sealing gaskets 20 concerns the dislodging of the gasket 20 when the disk drive assembly housing is disassembled. Maintenance of the disk drive assembly typically involves the first step of removing the housing cover 28 from the housing base 30 to gain access to the disk drive components contained therein. Upon removal of the housing cover 28, it has been found that conventional sealing gaskets 20 become easily dislodged from the mounting surfaces of either the housing cover 28 or housing base 30. Moreover, the semi-flexible gasket 20 is susceptible to temporary adherence during disassembly to either one or both of the mounting surfaces of the housing cover 28 and base 30. The unpredictability of the position of the gasket 20 upon removal of the cover 28 has several identified deleterious results. A dislodged gasket 20 often contacts the magnetic disks and/or the magnetic head assemblies which can damage these sensitive components, and introduce contaminants onto the disk surfaces. Manual effort to remove the gasket 20 after engagement with the disk surfaces or head assemblies often induces further contamination or damage. Also, mishandling and dropping of the gasket 20 can damage the gasket frame 22 or the sealing surfaces of the upper and lower sealing members 24 and 26.

The many deficiencies associated with conventional sealing gaskets employed in disk drive assembly housings that have heretofore been left unaddressed, are obviated by employment of a self-securing compliant gasket in accordance with the present invention.

SUMMARY OF THE INVENTION

Broadly, and in general terms, a sealing gasket assembly in accordance with the present invention is comprised of a frame and a resilient sealing member coupled to the frame, with a plurality of vacuum cavities provided on at least one of the surfaces of the resilient sealing member. The vacuum cavities, performing a function similar to vacuum cups, provide vacuum coupling between the resilient seal member of the sealing gasket and an adjacent mounting surface. Preferably, the gasket frame is constructed from rigid metal.

Another feature of the present invention involves a novel configuration of a resilient sealing member having a first sealing surface and a second sealing surface. A first sealing surface is fashioned to have a convex surface profile. The second sealing surface includes a plurality of spaced vacuum cavities integrally incorporated along the entirety of the second sealing surface. The convex profile of the first sealing surface in conjunction with the vacuum cavities provided on the second sealing surface of the resilient sealing member ensures predictable securement of the sealing gasket to a housing mounting surface.

In one embodiment, the sealing gasket is disposed between a cover and a base of a disk drive assembly housing. The sealing gasket provides environmental sealing of the disk drive components contained therein. When maintenance or repair is required, the housing cover is removed to provide access to the internal components. As the cover is removed, the convex surface of the sealing gasket produces a repellant force which is exerted against the housing cover. This repellant force results from internal forces generated by the compression of the convex profile when the housing cover and base are mounted together. Simultaneously, the vacuum cavities provide vacuum securement of the sealing gasket to the housing base. The inventors are unaware of any available sealing gaskets that provide both the vacuum sealing feature and repulsion feature of the present invention, which together insure that the self-securing gasket remains in its intended position when the cover is removed from the base.

In accordance with another aspect of the present invention, the use of primers and adhesives associated with conventional sealing gaskets is obviated by the mechanical coupling of the resilient sealing member to the rigid gasket frame. In one embodiment, a plurality of recesses are provided along the circumferential edge of the gasket frame. Preferably, elastomeric material is molded to the rigid gasket frame, with the elastomeric material covering portions of the gasket surface, including the recesses. Upon the hardening of the elastomeric material, the resilient sealing member becomes mechanically interlocked within the gasket frame recesses. In contrast to prior art, three-part sealing gaskets having four sealing interfaces, as illustrated in FIG. 4, the two-part sealing gasket of the present invention employs only two sealing interfaces, thus reducing the number of critical sealing interfaces by a factor of two. In the event that a defective gasket is produced, the unique mechanical interlocking of the resilient sealing member to the gasket frame facilitates easy removal of a defective sealing member from the frame. The gasket frame may then be reused, and a new sealing member molded thereon.

Another important aspect involves the unitary structure of the sealing gasket of the present invention. A two-part sealing gasket constructed in accordance with the present invention preferably involves molding elastomeric material around at least one circumferential edge of the gasket frame. In a preferred embodiment, a unitary sealing gasket is formed on at least a portion of the upper and lower surfaces of the frame, and along the inner circumferential edge of the frame. Thus, the sealing gasket of the present invention is comprised of two parts; a unitary resilient sealing member, and a frame to which the resilient sealing member is affixed.

In accordance with another aspect of the present invention, a plurality of alignment tabs are provided along the frame of the gasket. The alignment tabs are designed to be received by corresponding notches in the housing base. When the sealing gasket is initially installed onto the housing base, the alignment tabs on the frame are registered with the alignment notches provided in the base. The alignment tabs are then captured by the alignment notches, which provides a sealing gasket that is self-aligning with respect to its installation alignment on the housing base. This feature of the present invention eliminates the possibility of misassembly, and thus prevents the sealing gasket from ever contacting the sensitive magnetic disks or magnetic heads.

Other objects, features, and advantages of the present invention will become apparent from a consideration of the following detailed description and the accompanying drawings.

BRIEF DESCRIPTION OF THE DRAWINGS

FIG. 5 is a perspective view of a sealing gasket in accordance with the present invention;

FIG. 6 is a perspective view of a portion of the sealing gasket of the present invention illustrating the vacuum cavities integrally incorporated into the compliant sealing member;

FIG. 7 is a cross-sectional view of the gasket according to the present invention while in a relaxed state;

FIG. 8 is a side view illustrating a gasket of the present invention in a compressed state disposed between a housing cover and a housing base;

FIG. 9 is a cross-sectional view of a gasket of the present invention in a compressed state;

FIG. 10 is a an illustration of the rigid frame of a gasket in accordance with the present invention, with a plurality of recesses provided for mechanically interlocking with a compliant sealing member molded on the frame; and FIG. 11 is a cut-away perspective view of a sealing gasket of the present invention incorporating a plurality of alignment tabs thereon, and a plurality of associated alignment notches provided in a housing base for receiving the alignment tabs.

DETAILED DESCRIPTION OF THE PREFERRED EMBODIMENTS

Figure 2:
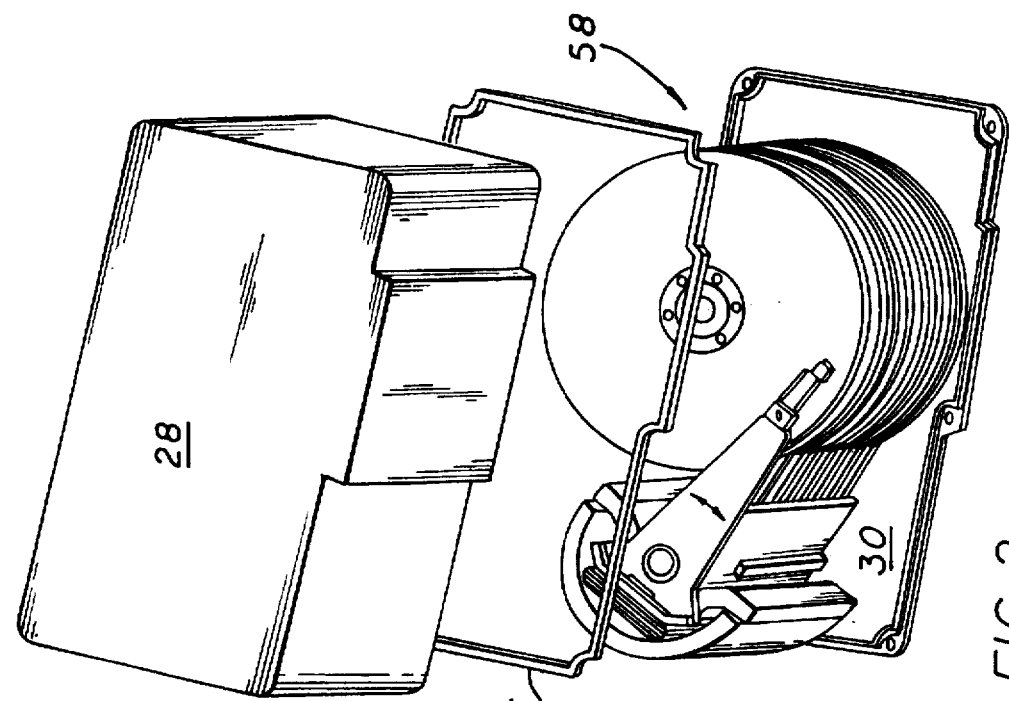
FIG. 2 is a perspective view of a typical disk drive assembly housing including a cover, a sealing gasket, and a base.
Figure 1:
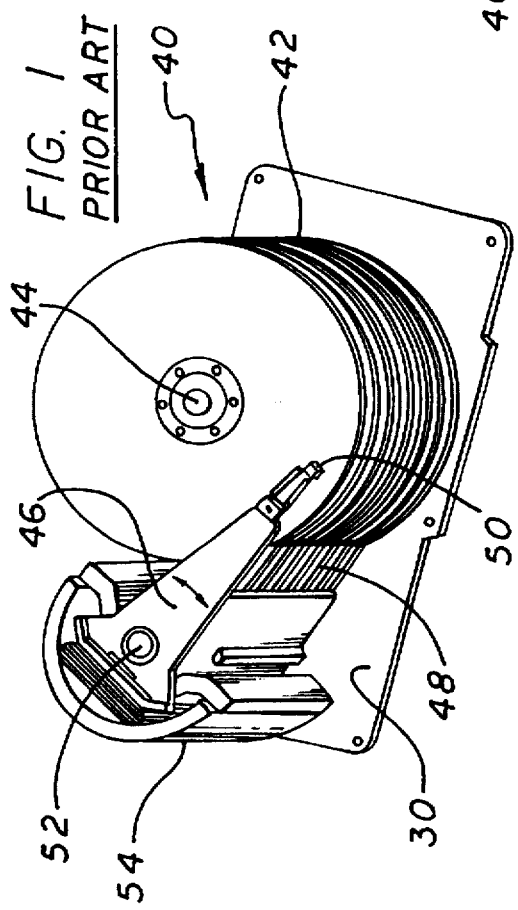
FIG. 1 is a perspective view of a Winchester or disk drive unit with its upper cover removed.

Referring more particularly to the drawings, FIG. 1 is an illustration of a disk drive unit 40 with its housing cover removed. The disk drive unit 40 includes a plurality of rigid magnetic storage disks 42 which are stacked coaxially in a tandem spaced relationship, and rotate about a common spindle 44 at a relatively high rate of rotation. A head positioner body 46 includes a plurality of interleaved head positioner arms 48, each having one or more magnetic heads 50 mounted thereon for reading and writing information magnetically onto the disk stack 42. The head positioner body 46 rotates about a stationary axis 52, causing the positioner arms 48 to interleave into and out of the magnetic storage disk stack 42. A magnetic coil assembly (not shown) disposed on the head positioner body 46 rotates within a permanent magnet structure 54, causing the head positioner arms 48 to sweep across the surfaces of the magnetic storage disks 42.

In one embodiment of the present invention, as illustrated in FIG. 5, a self-securing, compliant sealing gasket 60 comprises a gasket frame 62 onto which a compliant sealing member 64 is affixed. The compliant sealing member 64 includes two sealing surfaces, each of which performs a distinct and specialized function.

A first sealing surface of the compliant sealing member 64 includes a convex profile which facilitates securement of the sealing gasket 60 to the housing base 78 when the housing cover 76 is separated from the base 78. As illustrated in FIG. 7, the convex profile of this first sealing surface generates a repulsion force which is exerted against an adjacent mounting surface, preferably the housing cover 76, when the cover 76 is disengaged from the housing base 78. Internal repulsion forces are generated within the first sealing surface resulting from the compression of the convex surface as the sealing gasket 60 is compressed between the housing cover 76 and base 78. Separation of the sealing gasket 60 from the mounting surface of the housing cover 76 is substantially enhanced by the repulsion force exerted by the convex surface of the first sealing surface as the housing cover 76 is separated from the housing base 78.

A second sealing surface of the compliant sealing member 64, as shown in FIG. 6, includes a plurality of vacuum cavities 70 which are integrally incorporated into the structure of the compliant sealing member 64. The vacuum cavities 70 provide vacuum coupling between the sealing gasket 60 and an adjacent mounting surface, preferably a housing base 78. The coupling force provided by the vacuum cavities 70 spaced along the entirety of the sealing member 64 ensures securement of the sealing gasket 60 to the housing base 78 when the housing cover 76 is disengaged from the housing base 78. The two-part sealing gasket 60 of the present invention thus provides for predictable securement of the sealing gasket 60 on the housing base 78 during disassembly of the disk drive assembly housing resulting from the dynamic "push/pull" action of the first and second sealing surfaces respectively.

In one embodiment of the present invention, a gasket frame 62 is preferably constructed from stainless steel. Stainless steel series 301 and 304 are preferred metals, although other substantially rigid materials may also be employed, including other rigid metals, composite materials, and high-strength, heat-resistant engineering plastics, for example. As shown in FIG. 5, the gasket frame 62 is preferably dimensioned to generally conform to the shape of the mounting surfaces of the housing cover 76 and base 78. It is preferable that the amount of material used to construct the gasket frame 62 be minimized, thereby reducing both the weight and cost of the sealing gasket 60. Accordingly, in a preferred embodiment, the gasket frame 62 substantially conforms to the shape of the mating surfaces or flanges of the housing cover 76 and base 78 adjacent the disk drive assembly components.

Preferably, the gasket frame 62 is fabricated by stamping the gasket from stainless steel stock using an appropriately shaped stamping die. A gasket frame 62 manufactured in this manner can easily be mass produced at a relatively low cost. A plurality of alignment tabs 66, discussed in detail hereinbelow, may then be bent to form angles of approximately 90 degrees with respect to the plane of the gasket frame 62. The rigidity of the gasket frame 62 thus provides a structural frame onto which the compliant sealing member 64 may easily be affixed. Additionally, the rigid gasket frame 62 provides for easy handling, installation, and removal of the sealing gasket 60 when being installed or removed from the disk drive assembly housing.

In a preferred embodiment, a plurality of spaced vacuum cavities 70 are provided on one of the sealing surfaces of the compliant sealing member 64. As shown in FIGS. 6 through 9, the vacuum cavities 70 are preferably provided on the sealing surface of the compliant sealing member 64 which forms a sealing interface with the housing base 78. Alternatively, it may be desirable to include vacuum cavities 70 on the sealing surface of the compliant sealing member 64 which forms a sealing interface with the housing cover 76. When the sealing gasket 60 is compressed between the housing cover 76 and base 78 during assembly, the air trapped within the vacuum cavities 70 is evacuated. Upon removal of the housing cover 76 from the base 78 during disassembly, the relaxation of the compliant sealing member 64 to its natural configuration generates a negative pressure within the vacuum cavities 70, thus providing vacuum securement of the sealing gasket 60 to the housing base 78.

The preferred dimensions of the vacuum cavities 70 are determined by a number of design considerations, including the amount of sealing material surrounding the vacuum cavities 70 to ensure the integrity of the sealing interface, and the amount of vacuum coupling force required to insure that the sealing gasket 60 remains affixed to the housing base 78 when the housing cover 76 is removed. Another design consideration which influences the size and shape of the vacuum cavities 70 is the degree of curvature with respect to the convex upper sealing surface 72 of the compliant sealing member 64. As previously discussed, the degree to which the convex sealing surface 72 repels the housing cover 76 influences the amount of vacuum force required to ensure securement of the compliant sealing member 64 to the housing base 78. In a preferred embodiment, the vacuum cavities 70 are substantially hemispherical in shape, although other geometric configurations may be employed, such as elliptical and rectangular configurations.

A cross-sectional view of the sealing gasket 60 is provided in FIG. 7. The compliant sealing member 64 is affixed to a rigid gasket frame 62 preferably by mechanically coupling the sealing member 64 to the gasket frame 62. An upper sealing surface 72, having a convex profile, preferably engages the mounting surface of the housing cover 76. A lower sealing surface 73 includes a plurality of spaced vacuum cavities 70 which are integrally incorporated along the lower sealing surface 73 of the compliant sealing member 64. The gasket frame 62 is shown protruding outside of the body of the compliant sealing member 64. Alternatively, the compliant sealing member 64 may encompass most or all of the gasket frame 62. The extent to which the compliant sealing member 64 encompasses the gasket frame 62 may be adjusted to accommodate various sizes of housing assemblies which may impart higher levels of compressive force on the compliant sealing member 64 in order to ensure sufficient sealing of the assembly housing. Moreover, manufacturing costs and optimization of the molding process may influence the extent to which the compliant sealing member 64 encompasses the gasket frame 62.

Another important aspect of the present invention concerns the number of sealing interfaces which are required to seal the disk drive assembly housing. An exaggerated illustration of the sealing gasket 60 as installed in a disk drive assembly housing is shown in FIG. 8. Preferably, the sealing gasket 60 is disposed between the mounting surfaces of a housing cover 76 and a housing base 78. As a result of the mechanical coupling of the compliant sealing member 64 to the gasket frame 62, only two sealing interfaces are required to seal the housing.

Figure 4:
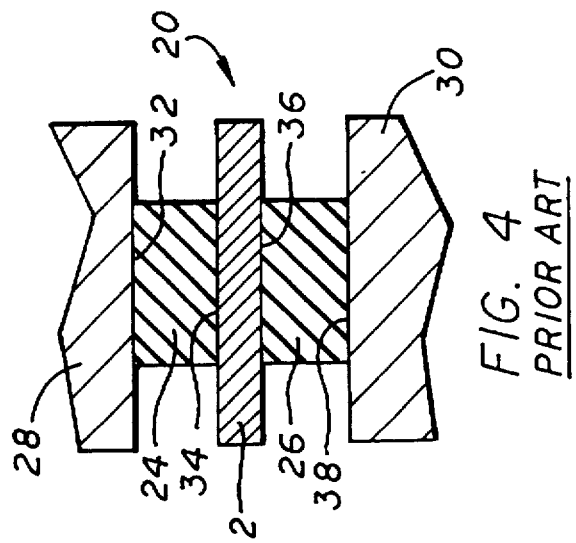
FIG. 4 is a cross-sectional view of a prior art sealing gasket.
Figure 3:
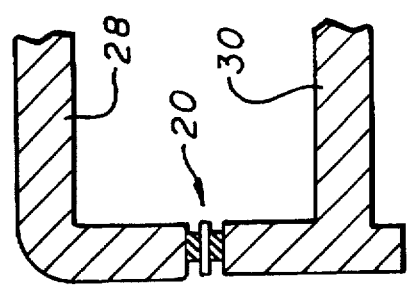
FIG. 3 is a cross-sectional view of a prior art sealing gasket disposed between a housing cover and a housing base.

An upper sealing interface 80 is shown being located between the upper sealing surface 72 of the compliant sealing member 64 and the mounting surface of the housing cover 76. A lower sealing interface 82 is shown being located between the lower sealing surface 73 of the compliant sealing member 64 and the mounting surface of the housing base 78. It is readily understood that the elimination of the two additional sealing interfaces associated with prior art three-part gaskets of the type shown in FIG. 4 substantially increases the efficacy of the sealing gasket 60, and thus eliminates two areas for potential sealing gasket failure. Additionally, the mechanical coupling of the compliant sealing member 64 to the gasket frame 62 obviates the need to chemically bond the sealing member 64 to the gasket frame 62. As previously discussed, the use of adhesives and primers have been associated with the introduction of contaminants into the sealed disk drive assembly housing due to outgassing of deleterious effluents into the clean environment of the housing.

An illustration of the compliant sealing member 64 in a compressed configuration is provided in FIG. 9. The initially relaxed sealing member 84 undergoes compression as the coupling force between the housing base 78 and housing cover 76 is increased during assembly. When the housing cover 76 and base 78 are securely mated, preferably by a plurality of screws, the compliant sealing member 64 is compressed therebetween, thus forming an environmental seal for the housing. FIG. 9 illustrates the dimensional changes which occur in the sealing member 86 as it undergoes compression; the vertical dimension is reduced, while and the horizontal dimension is increased. In a preferred embodiment, VAMAC rubber, a substantially air impervious material that will allow the vacuum cavities 70 to produce a suitable suction force when the sealing member 64 is compressed, is used to construct the compliant sealing member 64. It has been determined that the compressive forces required to nominally seal a disk drive assembly housing using a sealing gasket 60 constructed in accordance with the present invention results in approximately 35 percent compression in the vertical dimension, and approximately 28 percent compression in the horizontal dimension. This relatively minimal level of compression required to seal the housing substantially extends the service life of the sealing member 64. Further, any deleterious warpage of the housing base 78 resulting from the assembly process is substantially minimized or eliminated.

Another aspect of the invention concerns the lateral surface 74 of the compliant sealing member 64. The lateral surface 74, originally having a convex profile while in a relaxed state, compresses to from a series of bulges as shown in FIG. 9. The convex profile of the lateral surface 74 allows the compressed sealing member 86 to bulge and buckle in a predictable manner. Moreover, the convex shape of the lateral surface 74 provides for efficient removal of flash or excess elastomeric material which typically results from the process of molding the compliant sealing member 64 onto the gasket frame 62. The apex of the curved lateral surface 74 preferably lies in the same plane as the parting line of the mold.

The parting line of a mold is generally understood to be the line or plane where the two halves of the mold meet. When the elastomeric material is injected into the mold, excess material is forced out of the mold along the parting line. By judiciously designing the mold such that the apex of the curved lateral surface 74 is coincident with the parting line, the resultant flash can easily be removed by the mold operator. It has been found that the sealing gasket must be substantially free of excess material to prevent contamination of the sealed disk drive assembly housing.

In a preferred embodiment of the present invention, the compliant sealing member 64 is mechanically coupled, or interlocked, with the gasket frame 62. As shown in FIG. 10, a plurality of interlock recesses 88 are provided along the inner periphery of the gasket frame 62 to facilitate the mechanical coupling of the compliant sealing member 64 to the gasket frame 62. Preferably, the sealing gasket 60 of the present invention is constructed through a molding process by which the compliant sealing member 64 is molded to the gasket frame 62, preferably by an injection molding process. The gasket frame 62 may be placed in a mold after which a heated elastomeric material is injected into the mold. As the heated elastomeric material flows into the cavity of the mold, the elastomeric material covers the affected portions of the gasket frame, including the interlock recesses 88. When the sealing gasket 60 is removed from the mold, the hardened elastomeric material is captured or interlocked within the interlock recesses 88, thereby mechanically coupling the compliant sealing member 64 to the gasket frame 62.

In the event that the elastomeric material does not properly form to the gasket frame 62 during the molding process, the defective sealing gasket 60 may be removed from the mold, and the elastomeric material may simply be pulled off of the gasket frame 62, thus making the frame 62 available for subsequent molding. In this regard, a sealing gasket 60 manufactured in accordance with the present invention provides for a two-part gasket assembly which can easily be reworked. In contrast with the present invention, a three-part gasket constructed using a prior art bonding technique generally cannot be reworked, and consequently must be scrapped.

It has been further determined that utilizing the interlock recesses 88 of the present invention to mechanically couple the compliant sealing member 64 to the gasket frame 62 minimizes the amount of material required to fabricated the gasket frame 62. When utilizing a process by which a plurality of holes are included in the gasket frame, rather than a series of interlock recesses 88 in accordance with the present invention, conventional stamping techniques would necessitate a substantial increase in the width of the gasket frame 62 to accommodate the holes. The additional amount of sacrificial metal that would otherwise be required to accommodate the stamp holes is eliminated when employing the mechanical interlocking scheme of the present invention, thereby reducing the weight and cost of the gasket frame 62.

Another important aspect of the present invention concerns the self-alignment feature of the sealing gasket 60. As illustrated in FIG. 11, a plurality of alignment tabs 66 are provided along the outer periphery of the gasket frame 62 of the sealing gasket 60. Associated with each alignment tab 66 is a corresponding alignment notch 90 provided in the housing base 78. Preferably, the alignment notches 90 are created as a result of the die cast manufacturing of the housing base 78. The alignment tabs 66 and corresponding alignment notches 90 provide for a sealing gasket 60 which is extremely easy to install and properly align.

During installation of the self-aligning sealing gasket 60, the operator need simply register the sealing gasket 60 above the housing base 78 such that the alignment tabs 66 are properly aligned with respect to associated alignment notches 90. The operator may then place the sealing gasket 60 onto the housing base 78, allowing the alignment tabs 66 to be received and constrained within the corresponding alignment notches 90. The alignment notches 90 are strategically located on the housing base 78 to prevent any undesirable shifting of the sealing gasket 60 from its preferred alignment. Moreover, the alignment tabs 66 and notches 90 are preferably located near the screw holes 69 which facilitate secure mounting of the housing cover 76 to the housing base 78. Each screwhole 69 is associated with a corresponding boss 92 provided in the housing cover 76. The alignment tabs 66 prevent any inward shift of the sealing gasket 60, while the bosses 92 prevent any outward shifting of the sealing gasket 60 from its preferred installation position. In this regard, the alignment tabs 66 and notches 90, together with the bosses 92, fully capture the sealing gasket 60 onto the housing base 78 and prevent any undesirable shifting of the sealing gasket 60 during the assembly of a disk drive unit 40.

It is important to note that prior art sealing gaskets generally utilize the mounting screws of the assembly housing to properly align the gasket. However, any alignment benefit derived from abutment of the gasket and the mounting screws is not realized until the screws are actually inserted into the receiving screwholes and fully tightened. In contrast, the self-aligning sealing gasket 60 of the present invention provides for secure placement and alignment of the sealing gasket 60 by engagement of the alignment tabs 66 into corresponding alignment notches 90, prior to the introduction of the mounting screws.

In conclusion, it is to be understood that the foregoing detailed description and the accompanying drawings only relate to illustrative implementations of the present invention. The invention is not limited to these illustrative implementations. Thus, by way of example and not of limitation, various materials other than stainless steel may be employed in the construction of the gasket frame 62. Further, the compliant sealing member 64 may be constructed from elastomeric materials or composite materials other than those specified hereinabove. Moreover, the two-part sealing gasket 60 of the present invention may be employed for housings other than disk drive assembly housings which may require varying degrees of environmental sealing. Also, the vacuum coupling feature incorporated into the compliant sealing 64 may be employed in gasket assemblies constructed using conventional bonding manufacturing techniques. Also, the compliant sealing member 64 may be affixed to the gasket frame 62 using manufacturing techniques other than by injection molding. Further, the sealing gasket 60 may be used to provide either hermetic or non-hermetic sealing of a disk drive assembly housing.

It will be further understood, therefore, that various modifications and additions other than those described hereinabove can be made to the preferred embodiments of the present invention without departing from the scope or spirit of the present invention. Accordingly, the scope of the present invention should not be limited by the particular embodiments discussed hereinabove, but should be defined only by the claims set forth below and equivalents thereof.

What is claimed is:

1. A disk drive assembly comprising:
   a base having a mounting surface;
   a cover having a mounting surface; and a gasket disposed between said base and said cover, said gasket comprising:

a substantially rigid frame having an inner edge, which defines an opening in the frame, an outer edge, and first and second sides respectively extending from the inner edge to the outer edge, the first and second sides being longer than the inner and outer edges when the frame is viewed in a cross-section taken in a plane that is substantially perpendicular to the opening;

a sealing member constructed from resilient substantially air impervious material mounted on said frame, said sealing member having a substantially convex sealing surface associated with the first side of the frame abutting one of the base and cover mounting surfaces and a substantially planar sealing surface associated with the second side of the frame abutting the other of the base and cover mounting surfaces;

a plurality of substantially evenly spaced recesses provided along at least one of the inner and outer edges of said frame such that the recesses define respective portions of the at least one edge, said sealing member including portions which extend through, and are secured by, said recesses; and a plurality of substantially evenly spaced vacuum cavities provided on the substantially planar sealing surface of said sealing member, said vacuum cavities providing vacuum coupling between said substantially planar sealing surface and one of said base and cover mounting surfaces.

2. A disk drive assembly as claimed in claim 1 wherein the vacuum coupling between the substantially planar sealing surface of said sealing member and the mounting surface of said base provides securement of said gasket assembly on said base when said cover is separated from said base.

3. A disk drive assembly as claimed in claim 1 wherein said recesses are provided along said inner edge.

4. A disk drive assembly as claimed in claim 1 wherein said frame includes a plurality of tabs, and said base includes a plurality of notches, said tabs being received by said notches when said gasket assembly is registered with said base.

5. A disk drive assembly as claimed in claim 4 wherein said cover includes a plurality of bosses, said bosses inhibiting outward shifting of said frame, and said tabs and notches inhibiting inward shifting of said frame.

6. A disk drive assembly as claimed in claim 1 wherein said frame includes a first surface and a second surface, and said sealing member has a unitary structure and extends around one of the edges of said frame, over at least a portion of said first and second surfaces of said frame and completely through at least one of said recesses such that the portion of the sealing member covering the first surface is connected to the portion of the sealing member covering the second surface through the at least one recess.

7. The disk drive assembly as claimed in claim 1 wherein said frame is constructed from stainless steel.

8. The disk drive assembly as claimed in claim 1 wherein said sealing member is constructed from elastomeric material.

9. The disk drive assembly as claimed in claim 8 wherein said elastomeric material is a rubber material.

10. The disk drive assembly as claimed in claim 1 wherein said vacuum cavities are generally hemispherical in shape.

11. The disk drive assembly as claimed in claim 1 wherein said frame includes at least one tab, said tab providing alignment of said gasket assembly to said mounting surface.

12. A method of sealing a disk drive assembly housing comprising the steps of:

providing a base having a plurality of alignment notches;

providing a cover;

providing a gasket including a metal frame having an inner edge, which defines a central opening in the frame, an outer edge, and first and second sides respectively extending from the inner edge to the outer edge, the first and second sides being longer than the inner and outer edges when the frame is viewed in a cross-section taken in a plane that is substantially perpendicular to the central opening, and an substantially air impervious elastomeric seal mounted on said inner edge and secured thereto by a plurality of substantially evenly spaced recesses formed in the inner edge of said frame such that respective portions of said seal extend through said recesses, the elastomeric seal defining a width and including a first sealing surface associated with the first side of the frame and a second sealing surface associated with the second side of the frame, said first sealing surface being convex over the entire width of the elastomeric seal and said second sealing surface being substantially planar and including a plurality of substantially evenly spaced vacuum cavities, and said frame including a plurality of alignment tabs;

registering the gasket on the base with the alignment tabs of the frame being received by the alignment notches in the base; and coupling the cover, gasket, and base together.

13. The method as defined in claim 12 including the further step of molding the elastomeric seal to said metal frame.

* * * * *